United States Patent

[11] 3,632,321

[72] Inventors: Emile Plumat, Gilly; Jean Duthoit, Marcinelle; Francois Toussaint, Lodelinsart; Robert Van Laethem, Loverval, all of Belgium
[21] Appl. No.: 723,122
[22] Filed: Apr. 22, 1968
[45] Patented: Jan. 4, 1972
[73] Assignee: Glaverbel S.A., Watermael Boitsfort, Belgium
[32] Priority: Apr. 28, 1967
[33] Luxembourg
[31] 53,554

[54] PROCESS FOR ENHANCING THE EFFECTIVENESS OF CHEMICAL TEMPERING OPERATIONS OF VITREOUS MATERIAL
39 Claims, 3 Drawing Figs.
[52] U.S. Cl. ............................................. 65/30, 65/114, 204/1, 204/199, 204/212
[51] Int. Cl. .......................................................... C03c 21/00
[50] Field of Search ............................................. 65/30, 114, 60; 204/199, 212, 157.1 S, 1

[56] References Cited

UNITED STATES PATENTS

| | | | |
|---|---|---|---|
| 2,438,561 | 3/1948 | Kearsley | 65/60 X |
| 2,470,741 | 5/1949 | Gordon | 204/157.1 |
| 2,744,860 | 5/1956 | Rines | 204/157.1 |
| 3,357,876 | 12/1967 | Rinehart | 65/30 X |
| 3,428,513 | 2/1969 | Denman | 65/30 X |
| 3,467,508 | 9/1969 | Loukes | 65/30 |
| 3,486,995 | 12/1969 | Evers | 65/30 X |

FOREIGN PATENTS

| | | | |
|---|---|---|---|
| 620,787 | 8/1962 | Belgium | 65/30 |
| 679,637 | 4/1966 | Belgium | 65/30 |

Primary Examiner—S. Leon Bashore
Assistant Examiner—John H. Harman
Attorney—Spencer & Kaye

ABSTRACT: Processes and apparatus for enhancing the effectiveness of chemical tempering processes by subjecting the interface between a diffusion medium and a body between which an ion exchange is occurring to an electric field whose polarity through the interface is inverted at least once during the diffusion operation. The diffusion operation is also improved by subjecting the interface to pressure waves in the sonic or ultrasonic frequency range.

INVENTORS:
Emile Plumat
Jean Duthoit
François Toussaint
Robert van Laethem

BY Spencer & Kaye
Attorneys

PROCESS FOR ENHANCING THE EFFECTIVENESS OF CHEMICAL TEMPERING OPERATIONS OF VITREOUS MATERIAL

BACKGROUND OF THE INVENTION

This invention relates to processes and apparatus for tempering vitreous and vitrocrystalline materials.

It is known that glass can be toughened by a thermal tempering treatment. Thermal tempering involves heating and subsequently rapidly cooling the glass to set up compressive stresses in exterior layers thereof as a result of the more rapid cooling of such layers. Thermal tempering can not be employed for strengthening very thin sheets of glass, and even for thicker sheets such a tempering produces unavoidable deformations as well as optical defects. Windshields made of thermally tempered glass tend, if they fracture without falling apart, to divide into fragments whose size and distribution is such that the visibility through the windshield is very substantially reduced, thus creating a serious safety hazard.

It is also known that glass can be tempered chemically by causing metal ions to enter exterior layers of the glass from a contacting medium under suitable conditions. Two types of chemical tempering process can be distinguished. In one type, an ion exchange between the glass and the contacting medium takes place at a temperature sufficiently high for stress relaxation to occur in the glass and the ions entering the glass are such as to confer a lower coefficient of thermal expansion on the external glass layers. In the other type of chemical tempering process, ions in exterior layers of the glass are replaced by larger ions and the ion exchange is effected while the exterior glass layers are at a temperature below the annealing point (corresponding to a viscosity of $10^{13.2}$ poises) so that stress relaxation will not occur.

While it is possible to utilize a chemical tempering process to create high compressive stresses at the surfaces of the glass (higher in fact than can be achieved by thermal tempering) the thickness of the exterior layers of glass in which compressive stresses appear are very thin and the gradient of the compressive stresses beneath the glass surfaces is accordingly much steeper than the compressive stress gradient in thermally tempered glass. For certain purposes, this steep gradient is disadvantage because of the breakage characteristics which it imparts to the tempered glass.

SUMMARY OF THE INVENTION

It is a primary object of the present invention to eliminate, or substantially reduce, these drawbacks and difficulties.

Another object of the invention is to substantially improve the effectiveness of such chemical tempering processes.

A still further object of the invention is to increase the depth of penetration of ions during such chemical tempering processes.

Yet another object of the invention is to reduce the compressive stress gradient produced in the surface layers of such bodies by these processes.

A yet further object of the invention is to increase the rate of diffusion of ions into such bodies.

Still a further object of the invention is to eliminate the effects of "fatigue" on such diffusion processes.

Another object of the invention is to substantially increase the time during which a substantial diffusion of ions into the body will occur.

The present invention evolves in part from our discovery that shallower compressive stress gradients than have hitherto been obtainable by chemical tempering can be achieved by carrying out the process in the presence of an electric field extending transverse to the article surface and by causing the field polarity, or direction, to which each portion of the article/medium diffusion interface is subjected to be inverted at least once. The invention can be applied for tempering vitrocrystalline as well as wholly vitreous materials.

These and other objects according to the invention are achieved, in a process for chemically tempering a body of vitreous or vitrocrystalline material by causing ions of one type to diffuse out of the body in exchange for ions of another type provided by a diffusion medium in communication with, and forming a diffusion interface with, the body surface, by the improvement composed of producing an electric field through at least a portion of the diffusion interface, and causing the polarity of the field to which such portion is subjected to be inverted at least once during the diffusion operation. In a preferred embodiment of such process, the ions of one type are of one metal and the ions of another type are of another metal and the step of causing the polarity to be inverted is carried out so as to first cause the body side of the portion of the interface to be at a more positive polarity than the diffusion side, for inducing a movement of cations out of and away from the body, and to then cause the body side of such portion to be at a more negative polarity than the diffusion side, for inducing a movement of cations in a direction from the medium into the body. These processes are preferably carried out on bodies made of glass.

The process of the invention further includes simultaneously subjecting the body to the action of sonic or ultrasonic pressure waves during at least part of the diffusion operation.

The objects according to the invention are also achieved by the provision of apparatus for use in a process for chemically tempering a body of vitreous or vitrocrystalline material by causing ions of one type to diffuse into the body in exchange for ions of another type provided by a diffusion medium in communication with, and forming a diffusion interface with, the body surface.

According to one embodiment of the invention, the apparatus includes a pair of electrodes and power supply means connected to the electrodes for causing an electric field to be produced between them, the electrodes being arranged for causing the electric field to extend through at least one portion of the diffusion interface and one of the electrodes being hollow for supplying such medium to the body surface, the apparatus further including means for causing the polarity of the field to which such portion is subjected to be inverted at least once during the diffusion operation.

According to another embodiment, the apparatus is composed of a pair of electrodes and power supply means connected to the electrodes for causing an electric field of alternating polarity to be produced between them, the electrodes being arranged for causing the alternating polarity electric field to extend through at least one portion of the diffusion interface during the diffusion operation, the apparatus further including means for applying pressure waves in the sonic or ultrasonic frequency range to the interface during at least part of the diffusion operation.

DESCRIPTION OF THE PREFERRED EMBODIMENTS

Figure 1:
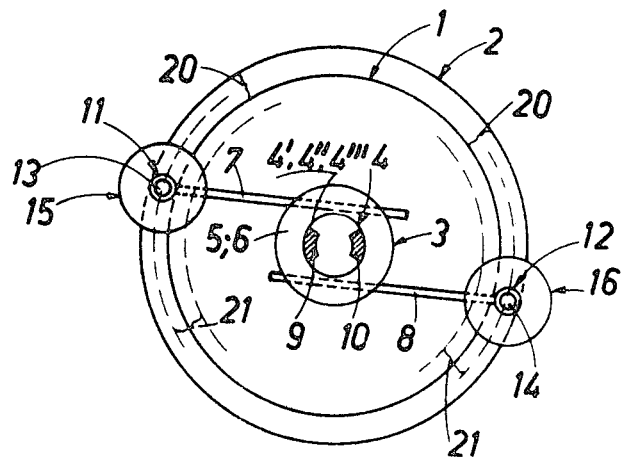
FIG. 1 is a plan view of one embodiment of apparatus according to the invention.

According to the present invention, in the chemical tempering of a vitreous or vitrocrystalline body, or part of the body, by a process involving the entry of ions into at least one surface of the body from a contacting medium in exchange for other ions, such ion exchange is made to take place under the influence of an electric field extending through the body/medium interface, and the field polarity is reversed at least once so that first one and then the other of the body and the medium is at the higher electrical potential.

The process of the invention can be carried out by contacting the opposed faces of a glass sheet with quantities of ionized media of the same or of respectively different compositions, the quantities being electrically insulated from each other and each being in contact with a different electrode, and by reversing the voltage polarity of the electrodes at least once during the process. Alternatively, a solid, possibly metallic, electrode may be placed in direct contact with one face of a glass sheet while the other face is in contact with an ionized medium which is in turn in contact with the second electrode, the polarity of the electrodes being reversed at least once during the process. The creation of these conditions causes substantial changes to appear in parts of the sheet, and both faces of the sheet are so prepared that further chemical tempering of these faces can be achieved while successively applying one or more supplementary reversals of polarity.

According to another possibility, two sets of electrodes can be provided to produce two electric fields having respectively opposite polarities and a sheet or ribbon of glass to be treated can be moved past the sets of electrodes so that each portion of the glass first passes between one set of electrodes and then between the other set, whereby each portion of the glass is subjected to an electric field whose polarity is reversed when the glass portion passes from the zone of influence of one set of electrodes to that of the other set.

The invention will hereafter be mainly described with reference to glass, to avoid repeated reference to vitrocrystalline material.

The results obtainable by the process of the invention are surprising primarily because it was not to be expected that a reversal of the polarity of a superimposed electric field would leave at least part of the glass in a condition which was substantially different from its original condition. The extent to which the ion exchange phenomenon is influenced by the electric field depends, inter alia, on the duration of each field polarity and the relation between the durations of the different field polarities, as well as on the values and relation between the values of the voltages of the successive polarity periods.

However, regardless of the particular values selected for these parameters, an advantage is realized, and in particular lower stress gradients are attainable, as will hereafter be shown, than can be achieved without such polarity reversal. In the case of an ordinary soda-lime glass, good results have been achieved using a field potential of 10–20 volts while maintaining the glass at a temperature of 500° C. The electric field obtained in this case being 10 volts/cm., one observes a decrease in the stress gradient by a factor of 1.5 up to 3.

The successive periods of the voltage field in a process according to the invention, each period being the time during which the voltage through a given portion of the glass has an unvarying polarity, can be of different durations and/or different electrical field strengths.

An important advantage is gained if the process of the invention is carried out so that during one period the electric field through the glass/medium interface has its higher, i.e., more positive, electrical potential at the glass side of such interface so as to induce a movement of cations out of and away from the glass, and during the next period the electric field through the interface has its higher electrical potential at the medium side thereof so as to induce a movement of cations into the glass from the medium.

Comparative tests involving the application of only one polarity reversal, the first and second periods being of relatively long duration, have shown that the application of first a positive and then a negative potential at the glass side of the glass/medium interface is not at all equivalent to the application of first a negative and then a positive potential at the glass side of the interface.

In fact, not considering the changes which may occur in other parts of the sheet influenced by the electric field, (e.g., at one face and an edge, or at one or the other face), it has been found that, if there is only one polarity reversal, an improved chemical tempering resulting in a shallower compressive stress gradient can only be achieved when the glass side of the glass/medium interface is brought to a lower, i.e., more negative, electrical potential only after it has been brought to a higher electrical potential.

On the other hand, no improvement in the chemical tempering was observed in that part of the sheet where the glass side of the glass/medium interface was first placed at a lower potential, and then at a higher potential, relative to the potential at the medium side of the interface. However, in the latter case, it was found that the part of the sheet which had been subjected to that polarity sequence was, as a result, prepared for an improved tempering, which can be effected by again bringing about, during a third period, a condition in which the glass side of the interface is at a lower potential than the medium side. It has also been observed that in any such case the polarity of the period has no prejudicial effect on the results produced by the next two periods.

When using more than one reversal of polarity, or even high-frequency reversals, it has been found that the achievement of a shallower compressive stress gradient is due to the successive pairs of polarity periods wherein the glass side of the glass/medium interface is at the higher potential during the first period of the pair but at the lower potential during the second period of the pair.

The invention is preferably applied by establishing the electric field between separated quantities of ionized medium contacting two separated surface zones of the glass body, for example two opposite surfaces of a glass sheet. In particular, the effect of only one polarity reversal can be made use of, for example, for tempering a vehicle windshield so that the outside and inside surfaces of the windshield will be under different compressive stresses.

Interdiffusion of ions can take place between a glass surface and a liquid medium forming a coating on such surface or a bath in which the glass surface is immersed, or between the glass surface and a gaseous medium. Suitable liquid media include aqueous solutions of electrolytes, but media composed of one or more molten salts are preferred.

The different polarity periods employed during the process can have a time interval between them or can follow one another immediately.

It is preferable, in all processes according to the invention, for the reversal of the positive-negative field direction through the interface to be repeated one or more times. Thus, it is possible to apply a continuously alternating potential, for example, at a frequency of about 10 Hz., or to repeatedly reverse the polarity of the voltage applied to the electrodes, leaving an interval of time between successive periods so that the diffusion through the glass of the ions which have already migrated into the glass can continue without the aid of an electric field, thus reducing the power consumption for producing a particular ion exchange.

There is an advantage in repeating the reversal of polarity in that it enables the compressive stress gradient to be made very shallow in a very short time. Very high-frequency field alternations can be used, for example frequencies in the vicinity of 100,000 Hz. The use of such very high frequencies tends to reduce the time required for producing a particular tempering effect and to produce a very homogeneous tempering of the treated area of the glass.

The invention is primarily but not exclusively intended for use in chemical tempering processes involving an interdiffusion of alkali metal or alkaline earth metal ions. The invention can be applied with particular advantage in the treatment of glasses of ordinary composition, i.e., common glasses formed from easily available inexpensive constituents, such as silica, soda, lime and feldspar. Thus, such glasses can be tempered by causing lithium ions to diffuse into the glass and to replace sodium ions, this being carried out at a temperature above the strain point of the glass, or potassium ions can be caused to diffuse into the glass to replace sodium ions while maintaining the glass at a temperature below the annealing point. By applying an electric field according to the invention either type of ion exchange can be made to occur in such a way that the ions introduced into the glass diffuse to a greater depth below the glass surface. This advantage is particularly apparent when comparing the results obtained when the technique according to the invention is used in processes involving the substitution of potassium ions for sodium ions, and those obtained when an identical exchange is performed without the help of an alternating electric field. In the absence of such a field, the potassium ions normally penetrate no further than a few tens of microns into the glass. By applying an alternating electric field, potassium ions can be caused to penetrate considerably deeper, for instance to a depth of several hundreds of microns.

According to certain preferred embodiments of the invention which relate to the replacement of given ions by ions of larger size while the temperature is below the annealing point of the glass, a medium is used which at the operating temperature provides not only the larger ions but also a small proportion of ions which are smaller than the ions to be replaced. The advantage of this feature can be illustrated by reference to an important exemplary process in which sodium ions initially present in the glass are replaced by potassium ions derived from a medium which also provides a minor proportion of lithium ions at the treatment temperature. When the field lines of an alternating electric field pass through the diffusing interface, causing an oscillatory motion of the cations, the highly mobile lithium ions initially penetrate deeper into the glass than the potassium ions during the period when the medium is at the more positive potential. However, sodium ions eventually become replaced by potassium ions in those glass layers where sodium ions were initially replaced by lithium ions. In such a process the required results can be accelerated by making those periods when the medium is at the more negative potential of longer duration and/or of greater field strength than the other periods.

It has been found that, during such a process, various substances can be caused to diffuse into the glass body in an atomic or molecular state if they are present in the medium constituting the source of ions which diffuse into the glass.

According to another feature of the invention, such ion exchange processes can be aided and improved by subjecting the vitreous or vitrocrystalline body to the action of ultrasonic waves for at least part of the time during which the ion exchange occurs under the influence of the electric field. It has been found that this promotes the penetration of ions into the body. This effect is particularly noticeable, and for that reason particularly advantageous, in those cases where large ions such as ions of an alkaline earth metal are to be introduced into the body.

Normally, ions of the alkaline earth elements do not penetrate into the body as easily as the smaller ions such as lithium ions or protons. Even if the medium contains small ions in addition to the larger ions so that the diffusion of the larger ions is assisted as previously described, the quantity of smaller ions which enter the body will under normal conditions be much greater than the quantity of larger ions which enter the body, even if the medium contains only a relatively small proportion of the smaller ions. However, if the ion exchange takes place while the body is subjected to an electric field whose polarity undergoes at least one reversal and to ultrasonic waves, the diffusion of larger ions into the body is found to be promoted in comparison with the diffusion of smaller ions. In fact, the larger the ions, the greater appears to be the increase in their rate of diffusion. Thus, the effect of the ultrasonic waves is particularly marked in the case of calcium, barium, and strontium ions, and also for cesium and rubidium ions, but their effect on the diffusion of potassium, sodium, lithium ions and protons is progressively less, in that order.

This specific effect of ultrasonic waves is detectable at wave frequencies of from 10,000–16,000 Hz., can be readily measured at wave frequencies above 16,000 Hz., and becomes stronger with increasing frequencies, which may exceed 10 million Hz. The quantity of ions which enter the body per unit time under the influence of ultrasonic waves of a given frequency increases with the power of the waves in accordance with an approximately logarithmic law as will hereafter be exemplified. In general the power of the waves should be at least of the order of 0.1 watt per $dm^2$.

The ultrasonic waves may be propagated perpendicularly to the interface or interfaces through which the ion migrations occur. When so propagated, the waves tend to extend the ion exchange phenomenon deeper into the body undergoing treatment, thereby further promoting the reduction of the stress gradient.

On the other hand, if the waves are propagated parallel, or substantially parallel, to an interface through which the ion exchange takes place, they tend to counter the normal tendency for the ion exchange to slow down after a certain quantity of ions have penetrated the body from the contacting medium, this tendency being in evidence when steps have been taken to maintain in this medium an adequate concentration of the ions to be donated to the body. This beneficial effect of wave propagation parallel with the interface increases proportionally with increases in the ultrasonic wave frequency and power.

If desired, wave propagations normal to and parallel with the interface may be superimposed on one another or they may be produced alternately during successive periods in the course of the chemical tempering of the body or any particular part thereof. In the interest of economy, however, it is better to rely solely on wave propagation parallel with the interface when it is desired to overcome "fatigue," i.e. the tendency for the ion exchange to slow down.

By performing a process according to the invention in which the body undergoing treatment is subjected to the action of ultrasonic waves, it becomes possible to modify a vitreous or vitrocrystalline body in such a way that the external, or surface, layers thereof are under compressive stresses due to the introduction of both large ions, such as rubidium ions, cesium ions, or alkaline earth metal ions, such as calcium or strontium ions, and smaller ions, such as lithium or sodium, the concentration of the larger ions being substantially higher than the concentration of the smaller ions.

The ultrasonic waves can be produced, for example, by electrostrictive or piezoelectric methods, or through the use of barium titanate vibration generators. However, for the production of very high frequencies, magnetostrictive methods are preferably employed in which a direct magnetic field is combined with a high-frequency magnetic field vibrating at the resonant frequency, for example, of a metal sheet disposed parallel to the body/medium interface, or at the resonant frequency of a bar, such as a nickel bar, disposed adjacent an edge of the body. In the latter case, assuming that the body is flat, for example a flat glass sheet, the supersonic waves will be propagated substantially parallel with the surface of the article. If the article is in contact with a thin metal layer, waves can be produced by acting on such layer and these waves may have a frequency equal, or close, to the resonant frequency of the thin layer, or a multiple thereof, or a frequency equal, or close, to the resonant frequency of the substrate and the coating layer when the glass is so composed.

Processes according to the invention can be applied for tempering part of a glass or vitrocrystalline body, for example part of a sheet of glass such as a flat or curved windshield or a hollow-ware article. The location and form of the electrodes can be selected to suit the form of the article and other circumstances. The tempering process can be confined, for any given period of time, to small closely spaced zones, and one or both of the electrodes can be moved to a different zone or zones during certain time intervals so that different zones are successively treated under the influence of an electric field whose polarity is reversed at least once.

In the manufacture of vehicle windshields it is sometimes useful to confine the tempering process to one or more marginal zones around a "vision safety area" of the windshield, which area corresponds generally with the driver's forward field of vision. For tempering the marginal zones, one electrode can be located in an ionized medium in contact with such zones and one or more other electrodes can be located against an edge of the windshield so that the electric field lines of a field created between the one electrode and the other electrodes pass through the zones, which are present on one or more surfaces of the glass, and extend along the glass to the electrodes at the sheet edge. The glass must in this case be warm enough to be electrically conductive, and the sheet edge must be at least one time positive and then negative with respect to the electrode located in the ionized medium.

Interdiffusion of ions into one face of a sheet or wall, such as the wall of a hollow article, at a given zone or zones can take place in the presence of an electric field established between an electrode contacting the medium adjacent such zones and an electrode in contact with the opposite side of the sheet or wall at such treatment zones. Alternatively, the electric field can be established between electrodes placed at the same side of the sheet or wall, as will hereafter be exemplified. In the latter case the surface region disposed between the zones must be electrically insulated so that the electric field lines will penetrate into the sheet or wall, thereby deepening the tempering effect.

Different zones of an article can be tempered in a similar way under the influence of different pairs of electrodes and tempering may take place at the different zones simultaneously or successively. Alternatively, tempering of different zones may occur under the influence of electric fields established between each of two or more electrodes and one common electrode. When tempering different zones, media having different chemical compositions or concentrations can be provided at the different zones, if required. Different effects can also be achieved by processing different zones at different temperatures.

By performing a process according to the invention for differentially tempering different zones of a vitreous or vitrocrystalline body, such as a vehicle windshield, thereby to obtain a tempering varying in degree from one zone to another for the purpose of imparting special breakage characteristics to the glass, the body can be subjected to the action of ultrasonic waves during the tempering of only some of the zones, or the body can be subjected to the action of ultrasonic waves which differ in frequency and/or in power from one zone treatment to another. This permits, for example a succession of small areas of the body to be enriched in ions whose diameters alternate between two or more values from one area to the next.

It is possible for interdiffusion to occur simultaneously into different surfaces of the glass, or into different surface zones thereof, from media in different forms, or states. Thus, one face of a sheet of glass may be in contact with a bath of molten salts and the other face may bear a coating of molten salts and diffusion of ions into the glass may take place from the two media under the influence of a single alternating electric field.

A given area of an article can be treated progressively by bringing about a relative movement between the article and at least one of the electrodes so that successive zones are successively transversed by the electric field.

The tempering effect is influenced by the strength of the electric field, which is in turn influenced by the distance between the electrodes. During a progressive tempering of a given area of an article as above referred to, a differential tempering can therefore be achieved within that area by displacing a pair of electrodes so that their spacing varies as processing proceeds.

In order to permit progressive tempering to be performed over a given area of an article, it is advantageous to use apparatus composed of at least one pair of electrodes at least one of which is hollow for the purpose of permitting quantities of a medium which provides the ions that are to diffuse into the article to be supplied through such electrode to the article surface. The invention includes any apparatus suitable for use in chemically tempering glass or vitrocrystalline material and composed of a pair of electrodes, at least one of which is formed as above described, and means for permitting an electric field to be established between the electrodes. It is an advantage of such apparatus that the composition of a liquid medium providing ions for diffusing into an article can be modified during processing, for example in order to offset any impoverishment or enrichment of the medium in given ions during the course of the process. The invention also includes any apparatus suitable for use in chemically tempering a glass or vitrocrystalline body and including a pair of electrodes, means for establishing an electric field of alternating polarity between the electrodes while the latter are in contact with quantities of ionized media communicating with surface zones of a body to be tempered, and means for subjecting such body to the action of ultrasonic waves.

Apparatus according to the invention preferably includes electrodes mounted to undergo a predetermined movement relative to an article surface during processing. It is an advantage to use such an apparatus for treating a given article surface progressively. An article with curved surfaces can be treated by such an apparatus without it being necessary to provide specially shaped electrodes. The electrode faces can be quite small, for example 1 $cm^2$. The electrodes may be mounted so that they move relative to each other in a predetermined manner as a function of another component of motion relative to an article surface.

The invention will now be illustrated by way of various specific examples in some of which reference is made to the accompanying diagrammatic drawings.

Figure 2:
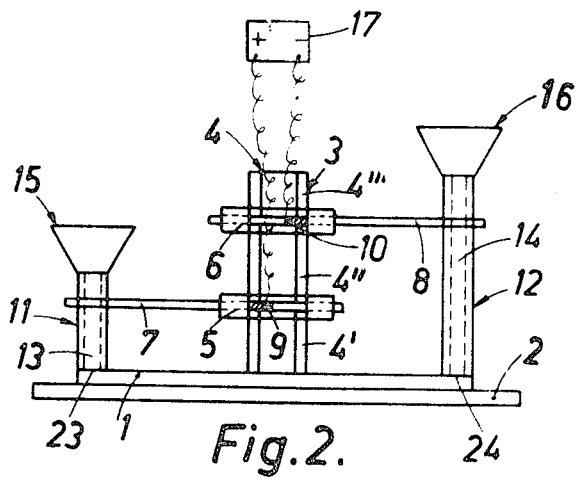
FIG. 2 is an elevational view of the apparatus of FIG. 1.

In the arrangement illustrated in FIGS. 1 and 2, a disk 1 to be treated and made of vitroceramic material having the following composition, by weight:

| | |
|---|---|
| $Li_2O$ | 15% |
| $Al_2O_3$ | 10% |
| $SiO_2$ | 50% |
| CaO | 10% |
| $B_2O_3$ | 8% |
| $TiO_2$ | 7% | the disc having a diameter of 90 cm., was placed on a support 2 forming part of a treating apparatus. This apparatus further includes a rotating device 3 composed of an insulating tube 4 having three sections 4', 4'', and 4''' which are spaced from one another and set in interposed metal rings 5 and 6. The sections 4'' and 4''' and the rings 5 and 6 rotate together to drive arms 7 and 8 in rotation by means of a suitable motor (not shown). The rings 5 and 6 are connected across a DC source 17 having an output potential of 80 volts via stationary brushes 9 and 10, respectively.

Means (not shown) cause the arms 7 and 8 to move stepwise in the direction of their longitudinal axis, relative to the rings 5 and 6, as the arms and rings rotate about the vertical axis of the tube 4. By this stepping movement two electrodes 11 and 12, carried by the arms 7 and 8, respectively, are moved stepwise towards that axis.

The electrodes are hollow graphite electrodes the respective bores 13 and 14 of which are 5 mm. in diameter, and they support reservoirs 15 and 16, respectively. Before setting the apparatus in rotation, the device 3 is lowered onto the vitroceramic disc 1 so as to occupy the position illustrated in which the axis of tube 4 coincides with the center of the disc 1.

EXAMPLE 1a

The disc 1 was maintained at a temperature of 300° C. The reservoirs 15 and 16 were filled with a mixture of 2 percent, by weight, $LiNO_3$ and 98 percent, by weight, $KNO_3$, which discharged through the electrode bores 13 and 14 while the electrodes 11 and 12 swept the surface of the disc 1 in a circular movement. The electrodes 11 and 12 made 20 complete revolutions every 3 minutes. Because of the connection of the electrodes via brush contacts, the polarity of each electrode does not change. However, after every 180° of electrode rotation around the axis of tube 4, the polarity of the field extending into the disc at any point along the path of electrode rotation will have been reversed. After 10 complete revolutions of the electrodes they are moved radially inwardly by the stepping mechanism (not shown) to such an extent that the second annular path 21 traced by the electrodes on the disc 1 overlapped the first path 20, as shown in FIG. 1.

The rotational and stepping movements continue until the electrodes 11 and 12 have moved close to the rings 5 and 6. The opposite side of the disc was then treated in the same way.

By the treatment, the disc was toughened in the area swept by the electrodes. In this area the disc had a tensile strength of over 100 kg./mm . In the central circular area, with a diameter just in excess of the diameter of rings 5 and 6, the tensile strength of the disc was only 23 kg./mm$^2$. The Mohs surface hardness of the toughened zone was greater than that of the central untoughened zone.

EXAMPLE 1b

Another test was performed, using the same apparatus, in which the electrodes made only one revolution in 10 minutes, at the end of which period the disc was examined. In the test, each point on the circular zone swept by the electrodes was swept first by one electrode and then by the other electrode. However, the treatment was not the same for all points because the points located along one half of the circular zone were first swept by the negative then by the positive electrode, while the other half of the zone was swept in the opposite order.

It was found that the half zone which had been made first positive and then negative with respect to the molten medium had become tempered with a shallow gradient of compressive stresses while the other half zone which had been made first negative and then positive with respect to the molten medium, did not show as great an improvement. The same results were obtained in further tests performed with the electrodes differently spaced so as to sweep other circular areas of the disc, for example the edge, the electrodes again making only one revolution.

In a still further test the electrodes were rotated through more than one revolution so that the zone of the disc which was made first negative and then positive, was then, in a third phase, made negative again. In that case it was found that this zone became tempered in the same manner as a zone which has been made first positive and then negative with respect to the molten medium.

Chemical tempering treatments aided by an electric field according to the invention could also be carried out on a moving sheet or ribbon of glass with the aid of electric field generating means which operate according to the principles of the apparatus of FIGS. 1 and 2 in that the polarity inversion is produced by a relative movement between the glass and electrodes connected so that the polarity of each does not change. However, in this case the relative movement is created by the movement of the glass, for example through the upper portion of a drawing tower, and the electrodes can be stationary.

Thus, if such a glass ribbon is moving upwardly through a tower and is provided with an ionized diffusion medium in the form of a thin film, the results according to the invention can be achieved by contacting one coated surface with one electrode permanently maintained at a negative potential and with one electrode permanently maintained at a positive potential, the positive electrode being downstream of the negative electrode with respect to the direction of glass movement. This will assure that, for each successive segment of the ribbon, the voltage across the glass/film interface will first be positive at the glass side, when the segment is near the negative electrode, and will then be negative at the glass side, when the same segment has moved to a point near the positive electrode.

One such electrode arrangement could be provided adjacent each surface of the ribbon for effecting a treatment according to the invention in both surface layers thereof.

EXAMPLE 2a

Figure 3:
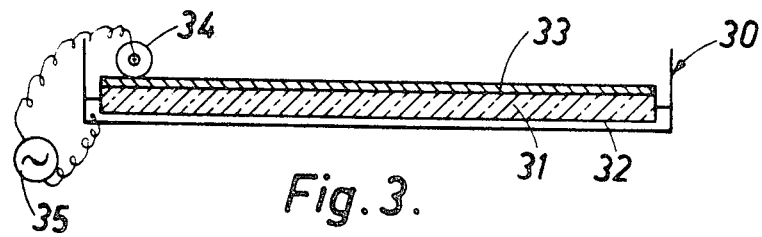
FIG. 3 is a simplified, elevational view of another embodiment of apparatus according to the invention.

As is shown in FIG. 3, a glass sheet 31 measuring 1×0.8× 0.005 m. and bearing a solid coating 33, 0.5 mm. in thickness and composed of a mixture of KNO$_3$, KCL, and MgNO$_3$, was tempered in an apparatus composed of a shallow tank 30 containing a shallow quantity of a medium 32 composed of a mixture of equal parts, by weight, of LiHSO$_4$ and KNO$_3$.

The apparatus used also included a porous cylinder 34 having about the same width as the sheet 31. The glass sheet was placed in the medium 32, the porous cylinder 34 was kept supplied with pure KNO$_3$ at 350° C. and was rolled, by any suitable means (not shown), to and fro along the coated top surface of the glass sheet.

At the prevailing temperatures, the medium 32 in the tank 30 was kept molten but the coating layer 33 on the glass sheet remained solid. The rolling contact of the cylinder 34, loaded with molten KNO$_3$, with the coating 33 was maintained for half an hour. At the end of that time, it was found that the toughening of the glass was confined to very thin surface layers of the sheet.

The process was then repeated with the medium 32 and the cylinder 34 connected to an AC generator 35 which maintained a peak voltage of 180 volts (corresponding to an electric field of about 33 volts per mm.) and a frequency of 200 Hz. through the interfaces between the molten medium 32 and the sheet 31 and between the coating 33 and sheet 31 in the region adjacent the roller. After only 15 minutes of treatment at the rate of 10 complete strokes per minute of the cylinder 34, it was found that potassium ions had penetrated to an appreciable depth, of around 0.5 mm., into the top of the sheet and to a somewhat lesser depth, of around 0.1 mm., into the bottom of the sheet, and that very shallow gradients of compressive stresses were produced. Magnesium ions had also penetrated into the top surface of the sheet to a depth of 0.1 mm. The treated sheet has a much improved tensile strength.

EXAMPLE 2b

A further similar sheet was treated in the same apparatus but with a high-frequency voltage (100,000 Hz., 3 volts peak) superimposed upon the original voltage. A bending test on this sheet, after its treatment, showed a rupture strength of 110 kg./mm$^2$. Apparently, in this second test the concentration gradient of the potassium and magnesium ions introduced into the glass was much less steep than in the former case, and this possibly accounts for the greater strength. When the sheet treated by the second test was caused to rupture, it broke into a multitude of noncutting fragments which are relatively small.

EXAMPLE 3

A glass windshield was coated, except in a central "safety" zone, with a thin layer composed of LiCl, NaCl LiNO$_3$, and KNO$_3$. In the safety zone the windshield was coated with a thin layer comprising 80 percent by weight rubidium peroxide and 20 percent by weight NaNO$_3$. A narrow zone surrounding the safety zone and dividing it from the outer coated area was covered by an insulating strip.

Chemical tempering was performed at 530° C. for 15 minutes while an electric field of 30 volts and at a frequency of 5 Hz. was maintained between two electrodes one of which was in contact with the coating on the safety zone and the other of which was in contact with the coating on the remaining area. Potassium ions penetrated into the glass in the latter area, and some toughening of the safety zone took place, apparently due to exchange of rubidium ions with sodium ions initially present in the glass. The insulated zone was not toughened. In comparative tests, results similar to those obtained in this example were obtained by following the same procedure but with electric fields of the following strengths and frequencies:

| | |
|---|---|
| 20 volts | 100 Hz.; |
| 10 volts | 1,500 Hz.; and |
| 5 volts | 10,000 Hz. |

EXAMPLE 4a

A coated glass sheet as treated in example 2a was treated in apparatus as shown in FIG. 3. During the chemical tempering, ammonia gas was bubbled through the medium 32, through a grille (not shown) located in the bottom of the tank. As in example 2a, superficial diffusion of ions into the glass took place in the absence of the alternating electric field.

When an alternating voltage of 180 volts and at a frequency of 200 Hz. was present, potassium and magnesium ions diffused into the sheet as in example 2a, i.e., more deeply and with shallower gradients, and, in addition, molecules of ammonia were found to have penetrated into the sheet to the same depth as the potassium ions. When subjected to bending forces, the sheet ruptured into very small noncutting fragments.

EXAMPLE 4b

When a similar sheet was treated in the same way but with an electric field voltage of 3 volts and a frequency of 100,000 Hz., the treated sheet, when subjected to bending forces, was found to have a higher tensile strength.

EXAMPLE 5

Sheets of flat glass were used having a thickness of 3 mm. and a chemical composition, by weight, as follows:

| | |
|---|---|
| $SiO_2$ | 80% |
| $B_2O_3$ | 15% |
| $Na_2O$ | 5% | the viscosity of the glass at 550° C. being $4 \times 10^{14}$ poises.

After being preheated to 550° C., the sheets were placed horizontally on a bath of molten salts. The bottom surfaces of the sheets were 1 mm. below the surface of the bath. The top surfaces of the sheets were then coated to a thickness of 2 mm. with the same molten salt medium, except for a 2 mm. wide peripheral zone of the sheet which was protected by a frame adhering to the glass and acting as a reservoir for the molten salts. The bath of salts had the following composition, by weight:

| | |
|---|---|
| LiCl | 2% |
| KCl | 10% |
| RbCl | 20% |
| CsCl | 20% |
| $Ca(NO_3)_2$ | 28% |
| $CaCl_2$ | 20% |

Electrodes of substantially the same sizes as the sheets of glass were then brought into contact with the quantities of salts contacting the top and bottom surfaces of the sheets and the electrodes were connected to an alternating voltage source providing a voltage of 5 volts at a frequency of 20 Hz. Various tests were carried out, each time on 10 identical samples, as follows:

a. without ultrasonic waves;
b. with ultrasonic waves of 20,000 Hz. and a power level of 0.3 watt/dm.$^2$;
c. with ultrasonic waves of 100,000 Hz. and 0.3 watt/dm.$^2$;
d. with ultrasonic waves of 1 million Hz. and 0.3 watt/dm.$^2$;
e. with ultrasonic waves of 100,000 Hz. and 1 watt/dm.$^2$;
f. with ultrasonic waves of 100,000 Hz. and 5 watt/dm.$^2$ In these six types of tests, the amounts of the following ions penetrating into the sheets were measured: $Li^+$, $K^+$, $Rb^+$, $Cs^+$, $Ca^{++}$. The comparative amounts are shown in table I for the penetration of each of the above ions during the first minute of treatment, the various values relating to the quantity of ions per unit time and unit area.

Ultrasonic waves propagated perpendicular to the plane of the sheets of glass were produced by vibrating a steel plate of the same area as the sheets of glass and disposed horizontally 3 cm. thereabove. The steel plate was supported at its four corners by vertical cylindrical nickel bars 10 cm. in length and 2 cm. in diameter. The upper ends of the bars were rigidly held and coils fed with electric current at the required frequency were wound around the bars, the current being of a value to produce a magnetic field which varied between 200 and —200 oersted in each bar.

TABLE I

Comparative amount of penetrating ions per unit time and unit area (1 being the quantity of potassium ions penetrating the glass during 40 seconds in test a)

| Type of ion | Test a | Test b | Test c | Test d | Test e | Test f |
|---|---|---|---|---|---|---|
| $Li^+$ | .4 | 5 | 6.2 | 6.5 | 8.2 | 9.3 |
| $K^+$ | 1.5 | 3 | 5 | 7.6 | 6.9 | 7.9 |
| $Rb^+$ | 0.4 | 2.5 | 4.5 | 7.8 | 6.2 | 7.2 |
| $Cs^+$ | 0 | 2.2 | 4 | 7.9 | 6 | 7 |
| $Ca^{++}$ | 0 | 2 | 3.9 | 8 | 6 | 7 |

EXAMPLE 6

The values given in table I were obtained during the first minute of the test. As the tests continued, a reduction was observed in the amount of ions penetrating, this reduction being due to "fatigue." For instance, in test c of example 5, after 10 minutes the comparative amounts per minute were only 4.5, 4, 3.7, 3.2, and 3.1 for $Li^+$, $K^+$, $Rb^+$, $Cs^+$, and $Ca^{++}$, respectively. The fatigue effect increased further when the test was continued for more than 10 minutes.

In a repetition of test c on a similar glass sheet, ultrasonic waves of the same frequency were propagated parallel to the sheet in addition to the waves perpendicular to the sheet. The waves parallel to the sheet were produced between two nickel bars disposed out of contact with the quantities of molten salts but parallel with, and adjacent, two opposed edges of the sheet. The bars were energized in the same way as the vertical bars supporting the steel plate above the glass sheet. It was found that the fatigue effect was eliminated and that the amounts of ions penetrating remained as stated in table 1 for test c even after treatment periods of longer than 1 hour.

It will be understood that the above description of the present invention is susceptible to various modifications, changes and adaptations, and the same are intended to be comprehended within the meaning and range of equivalents of the appended claims.

We claim:

1. In a process for chemically tempering a body of a vitreous or vitrocrystalline material initially containing exchangeable ions, which process includes; causing such ions to diffuse out of the body in exchange for ions of a different type provided by a diffusion medium in communication with, and forming a diffusion interface with, the body surface under time and temperature conditions to cause the body to become tempered, and during the diffusion operation producing an electric field through at least a portion of the diffusion interface, and causing the polarity of the field to which such portion is subjected to be inverted at least once during the diffusion operation, the improvement wherein said step of causing the polarity to be inverted is carried out at a rate of one revolution in approximately 10 minutes.

2. A process as defined in claim 1 wherein the ions initially contained in the material are cations of one metal and the different type ions are cations of another metal.

3. A process as defined in claim 2 wherein the body is of glass.

4. A process as defined in claim 1 wherein the electric field extends between two quantities of the diffusion medium which are each disposed adjacent a different surface region of the body.

5. A process as defined in claim 4 wherein the two quantities of the diffusion medium are of respectively different compositions.

6. A process as defined in claim 1 wherein the polarity of the field is inverted a plurality of times.

7. A process as defined in claim 1 wherein said step of causing the polarity to be inverted is carried out by providing a time interval between the existence of a field of one polarity and the existence of a field of the opposite polarity.

8. A process as defined in claim 1 wherein said step of causing the polarity to be inverted is carried out substantially instantaneously.

9. A process as defined in claim 8 wherein said step of causing the polarity to be inverted is carried out by causing the field to alternate continuously at a frequency of at least 20 Hz.

10. A process as defined in claim 1 wherein the diffusion medium is in the form of a coating on the body surface.

11. A process as defined in claim 1 wherein the diffusion medium is constituted by a bath in which the body surface is immersed.

12. A process as defined in claim 1 wherein the diffusion medium is in a gaseous state.

13. A process as defined in claim 1 wherein said step of causing the polarity to be inverted is carried out so as to cause the field to have one amplitude when it is at one polarity and a different amplitude when it is at the opposite polarity.

14. A process as defined in claim 1 wherein the ion exchange is carried out between the diffusion medium and successive portions of the body surface.

15. A process as defined in claim 14 wherein said step of causing the polarity of the field to be inverted is carried out by producing a relative movement between the body and the electric field.

16. A process as defined in claim 15 wherein the electric field is produced between two electrodes the voltage polarity of each of which is unvarying, and said step of causing the polarity to be inverted is carried out by producing a relative movement between the body and the electrodes.

17. A process as defined in claim 14 wherein said step of producing an electric field is carried out so as to cause a different electric field strength to be applied to each successive body surface portion.

18. A process as defined in claim 14 wherein the body is in the form of a thin member, the electric field is produced between two electrodes, one electrode is placed in contact with an edge of the thin member, the other electrode is maintained in contact with the diffusion medium and is moved relative to the body surface, and said step of causing the polarity to be inverted is carried out by periodically reversing the polarities of the voltage potentials of the two electrodes.

19. A process as defined in claim 1 wherein the ions initially contained in the material and the different type ions are alkali metal ions.

20. A process as defined in claim 1 wherein the body is of soda-lime glass.

21. A process as defined in claim 20 wherein the different type ions diffusing into the body are cations of several different sizes.

22. A process as defined in claim 1 wherein, in addition to the different type ions, nonionized atoms or molecules also diffuse into the body in an electric field.

23. A process as defined in claim 1 comprising the further step of applying ultrasonic pressure waves to the interface during at least part of the diffusion operation.

24. A process as defined in claim 23 wherein the ultrasonic waves are propagated perpendicular to the interface.

25. A process as defined in claim 23 wherein the ultrasonic waves are propagated substantially parallel to the interface.

26. A process as defined in claim 25 wherein ultrasonic waves are also propagated substantially perpendicular to the interface.

27. A process as defined in claim 1 wherein the body is a disc of vitroceramic material having the following composition, by weight:

| | |
|---|---|
| $Li_2O$ | 15% |
| $Al_2O_3$ | 10% |
| $SiO_2$ | 50% |
| CaO | 10% |
| $B_2O_3$ | 8% |
| $TiO_2$ | 7% | the diffusion medium is constituted by a mixture of 2% $LiNO_3$ and 98% $KNO_3$ maintained in a liquid state at a temperature of 300° C., said step of producing an electric field is carried out by disposing two electrodes in contact with diametrically opposed regions of one surface of the disc, with each electrode being permanently maintained at a respective voltage polarity, and said step of causing the polarity of the field to be inverted is carried out by moving the electrodes as a unit along a circular path about the axis of the disc.

28. A process as defined in claim 27 wherein each of the electrodes are caused to make one revolution about the disc.

29. A process as defined in claim 27 wherein the electrodes are periodically moved closer to the axis of the disc.

30. A process as defined in claim 1 wherein the body is constituted by a glass sheet and the medium is constituted by a molten bath in which one major surface of the sheet is immersed and a solid coating covering the other major surface of the sheet, the molten bath being composed of $LiHSO_4$ and $KNO_3$ and the solid coating being composed of $KNO_3$, KCl and $MgNO_3$, said step of producing an electric field is carried out by applying an electric potential between the molten bath and an electrode contacting the solid coating and arranged to move therealong, and said step of causing the polarity of the field to be converted is carried out by applying an alternating voltage between the bath and the electrode.

31. A process as defined in claim 30 wherein the voltage between the bath and the electrode has a value of 180 volts and a frequency of 200 Hz.

32. A process as defined in claim 31 comprising the further step of superimposing a high-frequency voltage having a peak value of 3 volts and a frequency of 100,000 Hz. on the voltage applied between the bath and the electrode.

33. A process as defined in claim 31 comprising the further step of bubbling ammonia gas through the molten bath during the diffusion operation.

34. A process as defined in claim 1 wherein the body is constituted by a glass windshield and the medium is constituted by a thin layer of LiCl, NACL, $LiNO_3$ and $KNO_3$ disposed on one part of one windshield surface, the remaining part of the windshield surface being coated with a layer of a mixture of rubidium peroxide and $NaOH_3$, said step of producing an electric field is carried out by applying a voltage between a first electrode in contact with the one part of the windshield surface and a second electrode in contact with the remaining part of the windshield surface, the voltage between the electrodes having a value of between 5 and 30 volts, and said step of causing the polarity to be inverted is carried out by causing the voltage to alternate at a frequency of between 5 and 10,000 Hz.

35. A process as defined in claim 1 wherein the body is constituted by a flat glass sheet having a thickness of 3 mm. and having the following chemical composition, by weight:

| | |
|---|---|
| 80% | $SiO_2$ |
| 15% | $B_2O_3$ |
| 5% | $Na_2O$, | and the diffusion medium is constituted by a bath of molten salts in which the sheet is immersed and a layer of molten salts applied to the top surface of the sheet, the molten salts of both the bath and the layer having the following composition, by weight:

| | |
|---|---|
| 2% | LiCl |
| 10% | KCl |
| 20% | RbCl |
| 20% | CsCl |
| 28% | $Ca(NO_3)_2$ |
| 20% | $CaCl_2$ | said step of producing an electric field is carried out by applying a voltage potential of 5 volts between the molten bath and an electrode contacting the layer of molten salts, and said step of causing the polarity of the field to be inverted is carried out by causing the voltage between the bath and the electrode to alternate at a frequency of 20 Hz.

36. A process as defined in claim 35 comprising the further step of applying ultrasonic pressure waves to the diffusion interface at at least one surface of the glass sheet, the ultrasonic pressure waves having a power level of between 0.3 and 5 watts/dm.$^2$, and a frequency of between 20,000 and 1 million Hz.

37. A process as defined in claim 36 wherein said step of applying pressure waves is carried out by vibrating a steel plate having the same area as the glass sheet and disposed horizontally 3 cm. above the upper surface of the sheet, the steel plate being vibrated in a direction perpendicular to the glass sheet surface.

38. A process as defined in claim 37 wherein said step of applying ultrasonic waves is further carried out by vibrating two nickel bars each disposed adjacent a respective one of two opposite edges of the sheet, the bars being vibrated in a direction perpendicular to such opposed edges.

39. In a process as defined in claim 1, the further improvement wherein such step of causing the polarity to be inverted is carried out so as to first cause the body to constitute an anode and the diffusion medium to constitute a cathode, for inducing a movement of ions out of and away from the body, and to then cause the body to constitute a cathode and the diffusion medium to constitute an anode, for inducing a movement of ions in a direction from the medium into the body.

* * * * *